United States Patent [19]

Takano et al.

[11] Patent Number: 5,073,147
[45] Date of Patent: Dec. 17, 1991

[54] BELT-TYPE CONTINUOUSLY VARIABLE TRANSMISSION WITH VARIABLE-SPEED PULLEY MECHANISM

[75] Inventors: Hiroshi Takano, Miki; Takashi Masuda; Tomizo Kanaoka, both of Hyogo; Hideyuki Akao, Shiga; Katsuyuki Hioki, Hyogo; Toshiaki Aragane, Takatsuki, all of Japan

[73] Assignee: Mitsuboshi Belting, Ltd., Japan

[21] Appl. No.: 502,299

[22] Filed: Mar. 3, 1990

[30] Foreign Application Priority Data

Mar. 30, 1989 [JP] Japan .................................. 63-80698
Jun. 14, 1989 [JP] Japan .................................. 1-153208

[51] Int. Cl.⁵ .............................................. F16H 11/06
[52] U.S. Cl. .................................................. 474/28
[58] Field of Search ....................... 474/11, 12, 17, 18, 474/28, 69, 70; 74/866-869

[56] References Cited

U.S. PATENT DOCUMENTS 4,583,423  4/1986  Hahne ............................... 474/28 X
4,784,630  11/1988  Takahashi .............................. 474/28

Primary Examiner—Thuy M. Bui
Attorney, Agent, or Firm—Wood, Phillips, Mason, Recktenwald & Van Santen

[57] ABSTRACT

A belt-type continuously variable transmission consisting of: an input/drive shaft with a rotational axis; an output/driven shaft with a rotational axis; a first variable speed pulley on the input/drive shaft and having a first pulley part fixed against axial movement relative to the input/drive shaft and a second pulley part movable axially relative to the first pulley part, with the first and second pulley parts cooperatively defining a belt-receiving groove; a second variable-speed pulley on the output/driven shaft and having a third pulley part fixed against axial movement relative to the output/driven shaft and a fourth pulley part movable axially relative to the third pulley part, with the third and fourth pulley parts cooperatively defining a belt-receiving groove; a fluid cylinder; structure for shifting the second pulley part axially relative to the first pulley part in response to a change in pressure in the fluid cylinder; a fluid reservoir on the first variable-speed pulley for rotation with the input/drive shaft; structure for sensing the rotational speed of the fluid in the fluid reservoir as the input/drive shaft is operated; and structure for communicating the sensing structure with the fluid cylinder to establish an equilibrium therebetween and to thereby vary the fluid pressure in the fluid cylinder as an incident of a change in the rotational velocity of the input/drive shaft and the fluid in the fluid reservoir.

34 Claims, 6 Drawing Sheets

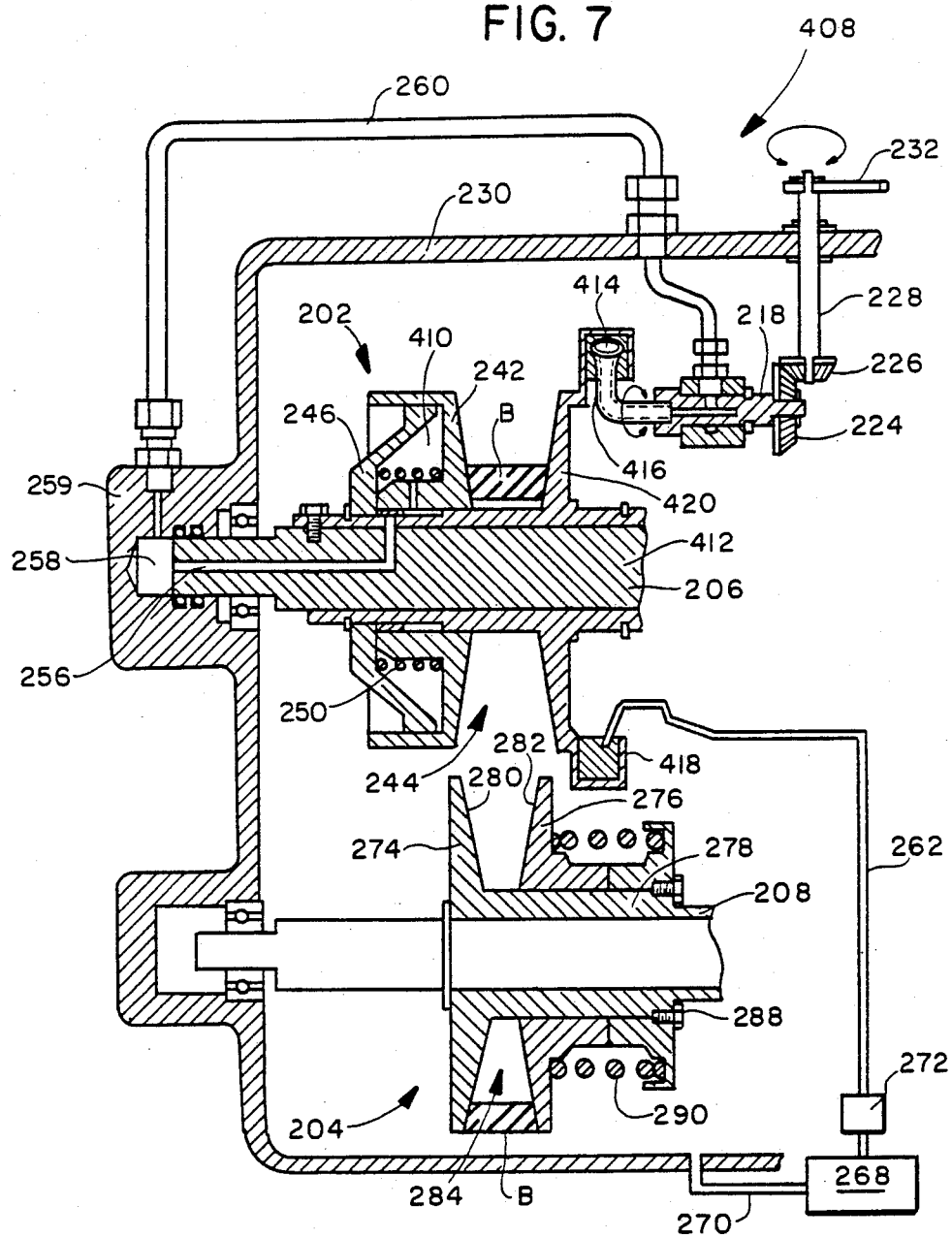
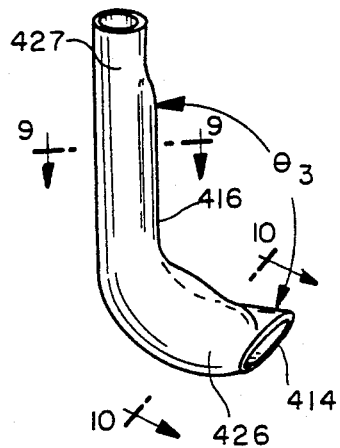
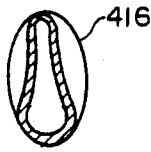

BELT-TYPE CONTINUOUSLY VARIABLE TRANSMISSION WITH VARIABLE-SPEED PULLEY MECHANISM

BACKGROUND OF THE INVENTION

1. Field of the Invention

The present invention relates to a belt-type continuously variable transmission with a variable-speed pulley mechanism for use as a continuously variable force transmission in a vehicle, such as an automobile and, more particularly, to a transmission with a variable-speed pulley mechanism having a fluid actuated movable pulley part that is shifted axially relative to a fixed pulley part to change the width of a belt-receiving groove defined therebetween in rapid response to a variation in the rotational velocity of a shaft carrying the variable-speed pulley mechanism.

2. Background Art

Belt-type continuously variable transmissions for vehicles, such as automobiles, are known in the art. Typically, these transmissions employ a pair of variable-speed pulley mechanisms associated with spaced, parallel, input/drive and output/driven shafts. A V-belt, or other type belt, is trained around the variable-speed pulley mechanisms.

With the prior art variable-speed pulley mechanisms mounted on input and output shafts, force transmission is performed by varying the pitch diameters of the pulleys and, as a consequence thereof, the relative rotational velocities of the input and output shafts. In such systems, the output shaft may be used to drive accessories on automobiles, such as hydraulic pumps for power steering, alternators, etc.

Each variable-speed pulley has cooperating pulley parts defining variable width belt-receiving grooves. One of the cooperating pulley parts is normally fixed and the other axially movable relative thereto to set the width of the belt-receiving groove and the effective diameter of the variable-speed pulley.

The position of the movable pulley part is controlled in the art by a number of different mechanisms. It is known to provide discrete particles in a space bounded in part by the movable pulley part so that as the rotational velocity of the shaft increases, the centrifugal force on the discrete particles urges the particles radially outwardly and against the movable pulley part so that a component of that force shifts the movable pulley part relative to the fixed pulley part.

Typically, when the centrifugal-type shifting mechanism is employed on the variable-speed pulley on the input shaft, the cooperating output shaft has a variable-speed pulley with a movable pulley part that is spring biased towards a fixed pulley part.

An exemplary, centrifugal-type, variable-speed pulley mechanism is disclosed in Japanese Patent Publication No. 51-6815. In that structure, movable weights, such as steel balls, are placed in radial guide grooves and movable radially along the grooves in response to rotation of the variable-speed pulley.

The centrifugal-type transmission has several drawbacks. First, there is an insignificant axial force developed by the discrete particles at low speeds. On the other hand, with high speed rotation, the centrifugal force of the discrete particles increases in proportion to the square of the rotational speed of the pulley to produce oft times excessive forces, particularly when accessories are driven. The centrifugal-type transmissions are thus effectively operable only in relatively high speed environments. Accordingly, conventional variable speed pulley mechanisms operated by discrete particles moving under centrifugal force encounter difficulty when used at low speeds and often have undesirably large diameter pulleys. The pulley diameter on the input side is required to be quite large to allow gradual increase of the shifting force on the movable pulley part in response to an increase in the rotational velocity of the input shaft. Further, in the centrifugal-type variable pulley mechanisms, due to the resistance encountered in axially shifting the movable pulley parts against the belt to vary the width of the groove, there is a lag in the movement of the movable pulley such that the curve on the graph plotting variation of the output speed with respect to that of the input speed at the time of acceleration significantly differs from the corresponding curve during deceleration i.e. there is a resulting hysteresis loss. In a vehicle in which there is a hysteresis loss, different output speed is obtained for the same input speed depending on whether the engine is accelerating or decelerating, which presents a problem in safety as well as operating performance.

In a centrifugal-type variable speed pulley mechanism, when the rotation of the input shaft increases, the rotational speed of the output shaft also increases. Accordingly, the rotational speed of the accessories, such as the hydraulic pump for controlling power steering, and the like, operated by the output shaft, also increases. While accessories are not generally adversely affected at lower speeds, excessive rotational forces at higher rotational speeds may cause rapid deterioration of the accessories and the belts connecting the accessories to the output shaft. There is also a significant energy loss resulting from the input shaft rotating at excessively high speeds.

Alternatively, hydraulic pressure can be utilized to shift the movable pulley parts towards the fixed pulley parts. An exemplary structure is shown in U.S. Pat. No. 4,601,680. In that structure, the amount of oil supplied to effect shifting of the movable pulley parts is dictated by an electronic control unit.

There has recently been developed a continuously variable transmission mechanism in which a fluid reservoir rotates together with a rotary shaft. The variation of the flow speed of the fluid in the reservoir, indicative of the shaft speed, is detected by a pitot tube to control the position of the movable pulley parts. One exemplary structure is shown in Japanese Patent Laid-Open No. 59222660.

Another continuously variable transmission is disclosed in UK Patent No. 1,525,674, in which a pitot tube is provided for sensing the increase in the rotational velocity of the shaft. The shaft carries a fluid reservoir in which the pitot tube is immersed. A pump and hydraulic control valve communicate with the pitot tube to generate a fluid pressure to move a movable pulley part relative to a fixed pulley part to thereby adjust the width of the belt-receiving groove.

In those transmissions utilizing hydraulic pressure, the amount of oil delivered is normally controlled by an electronic controller. A large amount of data is input to an electronic control unit. Several sensors are required for the data to be generated and the unit to operate effectively. The resulting structures are quite complicated and resultingly expensive, particularly when the hydraulic system interconnects both the input and output shafts.

SUMMARY OF THE INVENTION

The present invention is specifically directed to overcoming the above-enumerated problems in a novel and simple manner.

According to the invention, a belt-type continuously variable transmission is provided consisting of: an input/drive shaft with a rotational axis; an output/driven shaft with a rotational axis; a first variable speed pulley on the input/drive shaft and having a first pulley part fixed against axial movement relative to the input/drive shaft and a second pulley part movable axially relative to the first pulley part, with the first and second pulley parts cooperatively defining a belt-receiving groove; a second variable-speed pulley on the output/driven shaft and having a third pulley part fixed against axial movement relative to the output/driven shaft and a fourth pulley part movable axially relative to the third pulley part, with the third and fourth pulley parts cooperatively defining a belt-receiving groove; a fluid cylinder; structure for shifting the second pulley part axially relative to the first pulley part in response to a change in pressure in the fluid cylinder; a fluid reservoir on the first variable-speed pulley for rotation with the input/drive shaft; structure for sensing the rotational speed of the fluid in the fluid reservoir as the input/drive shaft is operated; and structure for communicating the sensing structure with the fluid cylinder to establish an equilibrium therebetween and to thereby vary the fluid pressure in the fluid cylinder as an incident of a change in the rotational velocity of the input/drive shaft and the fluid in the fluid reservoir.

It is a principal objective of the present invention to afford a transmission, particularly adaptable to driving accessories on an automobile engine, with variable speed pulleys that rapidly respond to a variation in the rotational velocity of the input/drive shaft.

Preferably, the fluid cylinder and fluid reservoir are in direct fluid communication through the sensing structure so that prompt pressure variation in the fluid cylinder results from a change in the rotational velocity of the input/drive shaft.

The inventive structure also substantially eliminates hysteresis loss i.e. to produce a proportional/linear relationship between the speed of the input and output shafts during acceleration and deceleration. To achieve this end, the sensing structure consists of a pitot tube with an inlet end that is located in the fluid reservoir. The invention contemplates repositioning of the inlet opening on the pitot tube relative to the fluid reservoir to produce a range of speeds for the output shaft for a given speed of the input shaft. It is thus possible to avoid excessive output speeds on accessories that otherwise results in energy loss and potential damage to the accessories and/or belts. Pitot tube repositioning is carried out externally of the transmission to preferably reduce the pitot tube/fluid cylinder pressure as the rotational velocity of the input/drive shaft increases. Preferably, the inlet opening is movable radially and/or the angle of the inlet opening is variable with respect to the fluid flow direction. By repositioning the inlet opening in a radial direction, the inlet opening can be placed selectively in fast and slow moving fluid, depending upon the sensitivity that is desired. By changing the angle of the inlet opening with respect to the fluid flow, the effective cross-sectional area of the inlet opening can be varied, as can the angle at which the fluid flow impinges on the opening, to selectively increase/decrease pitot tube/fluid chamber pressure. The pressure of the fluid in the fluid cylinder is proportional to the square of the rotational velocity. By controlling the pitot tube orientation, the rotational velocity/pressure relation can be altered.

In a preferred form, the pitot tube has an elongate body and an arm that is transverse to the length of the body and in which the inlet opening is provided. Structure is provided to pivot the body around its lengthwise axis so that the angular orientation of the arm can be varied relative to the fluid flow direction. Preferably, the angle between the arm and body is greater than 90° and less than 180°.

Still further, to avoid any turbulent effect on the fluid flow and any significant damping of rotation of the input/drive pulley, the pitot tube is made with a streamlined configuration. In a preferred form, the pitot tube has a curved configuration that is narrow at its leading end and widens away therefrom.

To provide maximum response to the fluid pressure, the pitot tube is provided with an elliptical cross section at the inlet opening. The opening has a radial and circumferential dimension. Preferably, the circumferential dimension is greater than the radial dimension so that substantially all of the flow intercepted by the inlet opening is high speed flow. In a preferred form, the plane of the opening is perpendicular to the flow direction.

The invention also contemplates pressure adjusting structure for relieving fluid pressure in the fluid pressure, as in the event of rapid acceleration. The pressure adjusting structure includes a valve body that is movable within a housing between a first position, in which a fluid pathway in communication with the fluid cylinder is blocked by the valve body, and a second position, in which the valve body is repositioned to open the fluid pathway, thereby relieving the pressure in the cylinder that would otherwise shift the second pulley part towards the first pulley part to diminish the width of the belt-receiving opening, as would result in a high speed/low torque drive condition. Fluid pressure, controllably generated externally of the transmission, is used to select the position of the valve body.

The invention also contemplates structure for continuously supplying fluid to the fluid reservoir. A pan is provided at the bottom of the transmission to collect fluid that falls out of the reservoir. The invention contemplates recycling the collected fluid back to the reservoir. In one version, the collected fluid flows into a tank and is from there pumped directly into the reservoir. In another version, paddles/scoops are mounted to one of the pulley parts and scoop the collected fluid as the pulley part is rotated and, as an incident of that rotation, deposit the fluid into the reservoir.

The recycling oil also serves as an effective lubricant for the system.

The invention also contemplates the provision of a coil spring to bias the second pulley part axially relative to the first pulley part so as to tend to diminish the belt-receiving groove therebetween to augment the pressure from the fluid cylinder. A stopper element is fixedly attached to the input/drive shaft. The coil spring is biasably positioned between the stopper and the second pulley part. The transmission can be used to drive automobile accessories, operable at slow speeds.

At slow speeds, the coil spring exerts the necessary bias on the second pulley part.

Another aspect of the invention is the provision of structure for rapidly and positively urging the fourth pulley part axially relative to the third pulley part so as to diminish the width of the belt-receiving groove defined therebetween under the influence of a large torque on the output pulley. A similar stopper is provided on the output/driven shaft with a coil spring interposed between the stopper and movable pulley part on the output/driven shaft. To further increase the bias on the movable pulley part on the output/driven shaft, cooperating cam structure is provided on the fourth pulley part and one of the output/driven shaft and third pulley part. Under high load/high torque conditions, the fourth pulley part tends to rotate relative to the third pulley part/output shaft as the belt drives the output pulley, which results in a camming action that shifts the fourth pulley part axially towards the third pulley part to augment the bias force from the coil spring. This places the transmission in a low speed/high torque state, which is desirable at startup and with a large load on the output shaft.

The inventive structure is effectively operable at even slow speeds with small diameter pulleys. The orientation of the pitot tube inlet opening can be correlated with the acceleration/deceleration of the input/drive shaft to adapt the device to many diverse environments.

BRIEF DESCRIPTION OF THE DRAWINGS

FIG. 7 is a section view of a further modified form of belt-type continuously variable transmission according to the present invention;

FIG. 8 is an enlarged perspective view of a preferred form of pitot tube for use in the inventive structure;

FIG. 9 is a sectional view of the pitot tube taken along line 9—9 of FIG. 8;

FIG. 10 is a sectional view of the pitot tube taken along line 10—10 of FIG. 8;

DETAILED DESCRIPTION OF THE DRAWINGS

Figure 1:
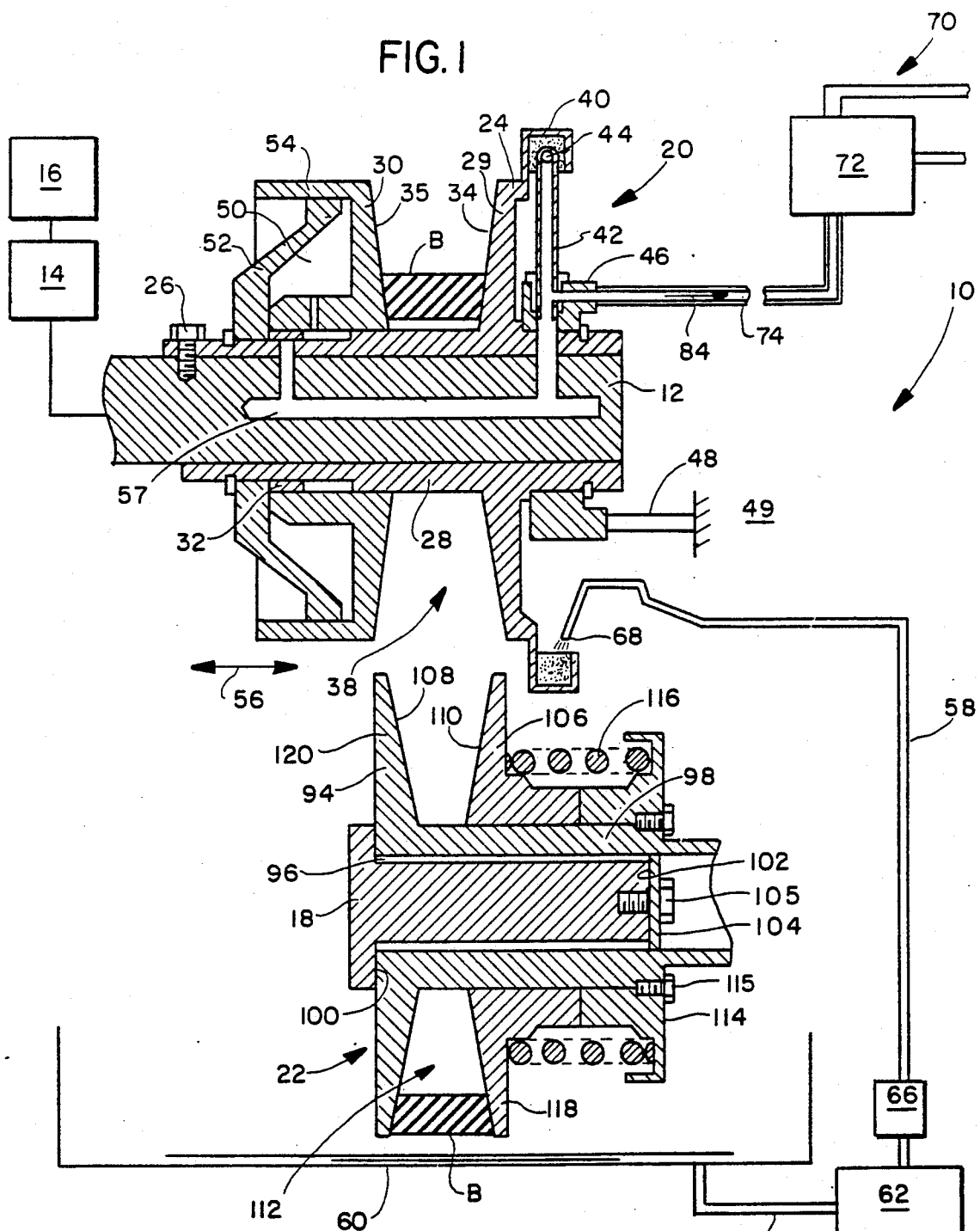
FIG. 1 is a section view of a belt-type continuously variable transmission according to the present invention including variable-speed pulleys on input/drive and output/driven shafts.
Figure 2:
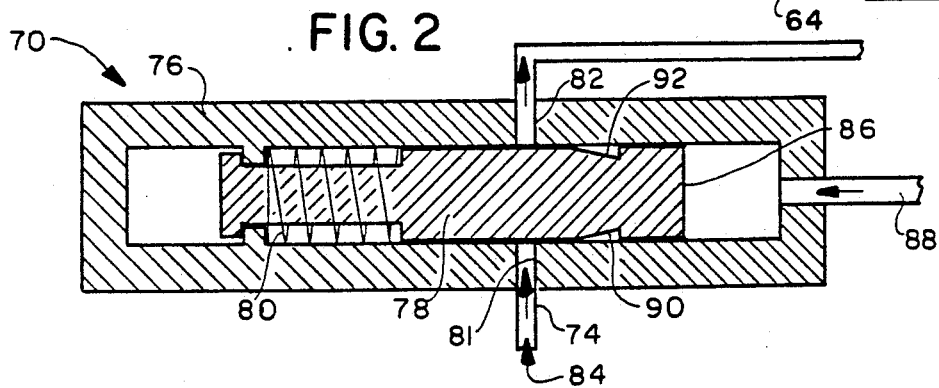
FIG. 2 is an enlarged section view of an external pressure adjusting means for controlling the pressure in a hydraulic cylinder used to axially move one of the pulley parts on the variable speed pulley on the input section relative to a fixed pulley part thereon so as to determine the width of a belt groove defined between the pulley parts.
Figure 3:
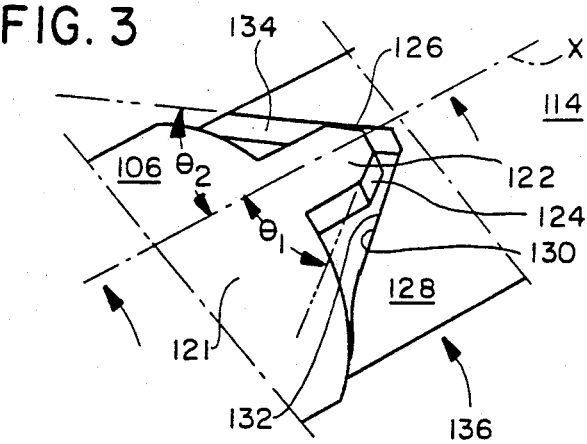
FIG. 3 is an enlarged, fragmentary perspective view of cooperating cam drive structure on a movable pulley part on the variable pulley on the output side and a stopper element fixed to the output/driven shaft.

A belt-type continuously variable transmission, in accordance with the present invention, is shown at 10 in FIG. 1, with certain structural details of the transmission 10 shown in FIGS. 2 and 3. The transmission 10 is designed for use as a continuously variable transmission mechanism (CVT) in an automobile, or in other environments in which (a) an input/drive shaft 12, connected indirectly to the crank shaft 14 of an engine 16, and an output/driven shaft 18, reside in parallel relationship, (b) and a force transmission belt B is operatively connected between variable-speed pulleys 20 and 22, mounted respectively on the input/drive shaft 12 and the output/driven shaft 18.

The variable-speed pulley 20, mounted to the input/drive shaft 12, has a first pulley half 24 fixed to the input/drive shaft 12 by means of a bolt 26. The bolt 26 extends through a sleeve 28, integrally formed with a radially extending flange 29 on the pulley half 24 and surrounding the input/drive shaft 12, and into the input/drive shaft 12. Splines, a key and slot, or other known cooperating structures can be used on the pulley half 24 and input/drive shaft 12 to effect this connection. The pulley 20 has a second, movable pulley half 30 mounted on the sleeve 28 on the first pulley half 24. The pulley half 30 is fixed against rotation relative to the sleeve 28 by splines or a key(s) 32 cooperating between the sleeve 28 and pulley half 30. The pulley halves 24, 30 have facing surfaces 34, 35, respectively, cooperatively defining a belt receiving groove 38. On the peripheral portion of the first pulley half 24 is a ring-shaped fluid reservoir 40. At least one pitot tube 42 is provided with its tip opening 44 extending into the fluid reservoir 40.

The pitot tube 42 is carried by a fixed connector 46 in which the input/drive shaft 12 is journalled for free rotation. The pitot tube 42 detects the flow speed and pressure of the fluid inside the fluid reservoir 40, which is indicative of the rotational velocity of the pulley half 24 and input/drive shaft 12. The connector 46 is fixed against rotation by a rod 48 connected to a support 49.

A hydraulic cylinder 50 is provided within the movable pulley half 30. The hydraulic cylinder 50 is defined between a plate member 52, fixed to the sleeve 28, and a sleeve-like peripheral surface 54 integral with the movable pulley half 30. The internal pressure of the hydraulic cylinder 50 varies in accordance with the increase or decrease in amount of fluid introduced therein. The pressure in the cylinder 50 dictates movement of the pulley half 30 along the axis of the input/drive shaft 12 i.e. along the line indicated by the double-headed arrow 56. The peripheral portion of the plate member 52 may be provided with a seal (not shown) at the juncture of the sleeve-like surface 54 and plate member 52.

The hydraulic cylinder 50 is in fluid communication with the pitot tube 42 through a fluid path 57 defined in the input/drive shaft 12 and the connector 46. Fluid is drawn into or expelled from the tip opening 44 of the pitot tube 42 to continually control the internal pressure of the hydraulic cylinder 50 in response to the rotational speed of the input/drive shaft 12.

The fluid reservoir 40 is fed continuously by a fluid supply line 58. The fluid, i.e. oil, is collected in a pan 60 provided at a bottom portion of the transmission 10, flows by gravity therefrom into a tank 62 via a conduit 64 and is delivered therefrom by a pump 66 through the fluid supply line 58 to a discharge opening 68 therein and into the reservoir 40. Fluid flowing out of the fluid reservoir 40 drops under the force of gravity into the pan 60.

The variable-speed pulley 20 is provided with an external fluid pressure adjusting means 70 capable of adjusting the internal pressure of the hydraulic cylinder 50 by drawing off a desired amount of the fluid from the cylinder 50. The fluid pressure adjusting means 70 has a one-way hydraulic pressure control valve 72 communicating with the fluid path 57 through a conduit 74 extending through the connector 46.

An exemplary type of pressure adjusting means 70 is shown in FIG. 2, in which the hydraulic pressure control valve 72 consists of a cylindrical housing 76 having therewithin a movable cylindrically-shaped valve body 78 surrounded by a coil spring 80. The housing 76 has a radially directed bore 81 therethrough for accepting a conduit 82 defining a fluid path 84. The valve body 78 slides to the left in FIG. 2 when the oil pressure on the head portion 86, supplied through an oil path 88, overcomes the force of the spring 80. When an external oil pressure is applied to the head portion 86 of the valve body 78, the fluid path 84 is closed. When oil pressure, above a predetermined amount, is applied to the head portion 86, the valve body 78 moves against the force of the spring 80 to form an oil path through an annular space 90 between the valve body 78 and the cylindrically-shaped housing 76 as an undercut surface 92 defining the space 90 aligns axially with the fluid path 84.

On the variable speed pulley 22, carried by the output/driven shaft 18, a first pulley half 94 is fixed against rotation relative to the output/driven shaft 18 by means of cooperating splines 96 on the output/driven shaft 18 and a sleeve 98 on the pulley half 94 surrounding the output/drive shaft 18. The relative axial positions of the pulley half 94 and shaft 18 is fixed by capturing the pulley half 94 between an axially facing shoulder 100 on the shaft 18 and a shoulder 102 on a plate 104 attached as by a bolt 105 to the end of shaft 18. A movable pulley half 106 surrounds the sleeve 98 and is movable axially and rotatably relative thereto. Facing surfaces 108, 110 on the pulley halves 94, 106, respectively, define a belt-receiving groove 112.

A flange-shaped stopper 114 is fixed to the sleeve 98 by means of a bolt 115 adjacent to the movable pulley half 106. A coil spring 116 acting between a radial flange 118 on the pulley half 106 and the stopper 114 biases the flange 118 toward a radial flange 120 on the pulley half 94.

As seen in FIG. 3, the movable pulley half 106 has a cylindrical axial extension 121 which is provided with at least one projection 122. The projection 122 has oppositely inclined side surfaces 124, 126 respectively making angles of $\Theta_1$ and $\Theta_2$, with a lengthwise axis X, in the range of 20° to 70° and preferably in the range of 25° to 50°. The angles $\Theta_1$ and $\Theta_2$ ordinarily have different values, however they may have the same value. The stopper 114 has a cylindrical extension 128 at the axial end of which a notch 130 is formed having inclined surfaces 132, 134, to be respectively abutted to the inclined side surfaces 124, 126 of the projection 122. With the above construction, the extension 121 of the movable pulley half 106 is engaged with the extension 128 of the stopper 114 with the projection 122 thereof engaged with the notch 130 in the stopper 114.

The above construction forms a cam torque transmitting section 136 to transmit torque from the input/drive shaft 12 to the output/driven shaft 18. When the movable pulley half 106 is rotated by the belt B, the projection 122 on the extension 121 of the movable pulley half 106 is engaged within the notch 130 on the extension 128 of the stopper 114 with the inclined surfaces 124, 126 facially abutted to the inclined surfaces 132, 134, respectively, to transmit torque from the movable pulley half 106 through the stopper 114 to the output/driven shaft 18. The axial force component produced by the cammed engagement between the inclined surfaces 124, 126 and the inclined surfaces 132, 134 of the torque transmitting section 136, in combination with the resilient bias force of the spring 116, results in a drive force from the belt B being positively imparted to the variable speed pulley 22 and resultingly the output/driven shaft 18.

The following describes the operation of the belt-type continuously variable transmission 10 in accordance with the present invention. When the rotational velocity of the input/drive shaft 12 is small, the flow speed and pressure of the fluid detected by the pitot tube 42 is relatively small, which results in a relatively small internal pressure in the hydraulic cylinder 50 a well as a relatively small axial shifting force on the movable pulley half 30. On the other hand, when the torque exerted on the output/driven shaft 18 is greater, the movable pulley half 106 on the variable-speed output pulley 22 mounted to the output/driven shaft 18 receives a greater drive force that acts on the movable pulley half 106 to cam the surfaces 124, 126 more positively against the surfaces 132, 134 to increase the right-to-left bias on the pulley half 106 in FIG. 1. This bias, in combination with the force of the coil spring 116, diminishes the width of the groove 112 to draw the belt B deeper into the groove 38 on the input side of the system, resulting in a high torque/low speed drive.

When the input/drive shaft 12 increases its rotational velocity, the pitot tube 42 detects a corresponding increase in the flow speed and pressure of the fluid in the reservoir 40. Flow of fluid to the cylinder 50 increases as does the internal pressure therein. The result is that the movable pulley half 30 moves from left-to-right in FIG. 1 relative to the fixed pulley half 24. This diminishes the width of groove 38, wedging the belt B radially outwardly on the input side to produce a low torque/high speed drive.

When the rotational velocity of the input/drive shaft 12 is reduced, the internal pressure of the hydraulic cylinder 50 is greater than the pressure detected by the pitot tube 42 so that the fluid in the hydraulic cylinder 50 is bled off, primarily through the tip opening 44 of the pitot tube 42. As a result, the internal pressure of the hydraulic cylinder 50 adjusts to an appropriate value corresponding to the rotational velocity of the input/drive shaft 12 to position the belt B to effect the appropriate pitch diameters on the variable-speed pulleys 20, 22 i.e. the belt B moves radially into the groove 38 on the input side and out of the groove 112 on the output side. The fluid which has been drawn off from the cylinder is collected in the pan 60 to be recycled.

In the case where the speed of the automobile to which the present transmission 10 is attached rapidly increases, the fluid pressure adjusting means 70 operates to draw the fluid off the hydraulic cylinder 50 by externally applying an oil pressure to the pressure control valve 72 to reduce the pressure in the cylinder 50 and in turn the left-to-right pressure on movable pulley half 30 so that the input pulley 20 remains in a slower speed/higher torque stage.

More specifically, as seen in FIG. 2, by supplying oil to the oil path 88 against the head portion 86, the valve body 78 is moved against the force of the spring 80 i.e. right-to-left in FIG. 2. As a result, the annular space 90 surrounding the valve body 78 is moved axially to register with the through conduit 82 so that the fluid in the conduit 74 flows in the path 84 out of the system to reduce the internal pressure of the hydraulic cylinder 50. When the internal pressure of the hydraulic cylinder 50 is reduced below a predetermined amount, the valve body 78 moves in the reverse direction under the force of the spring 80 back to the FIG. 2 position.

Figure 4:
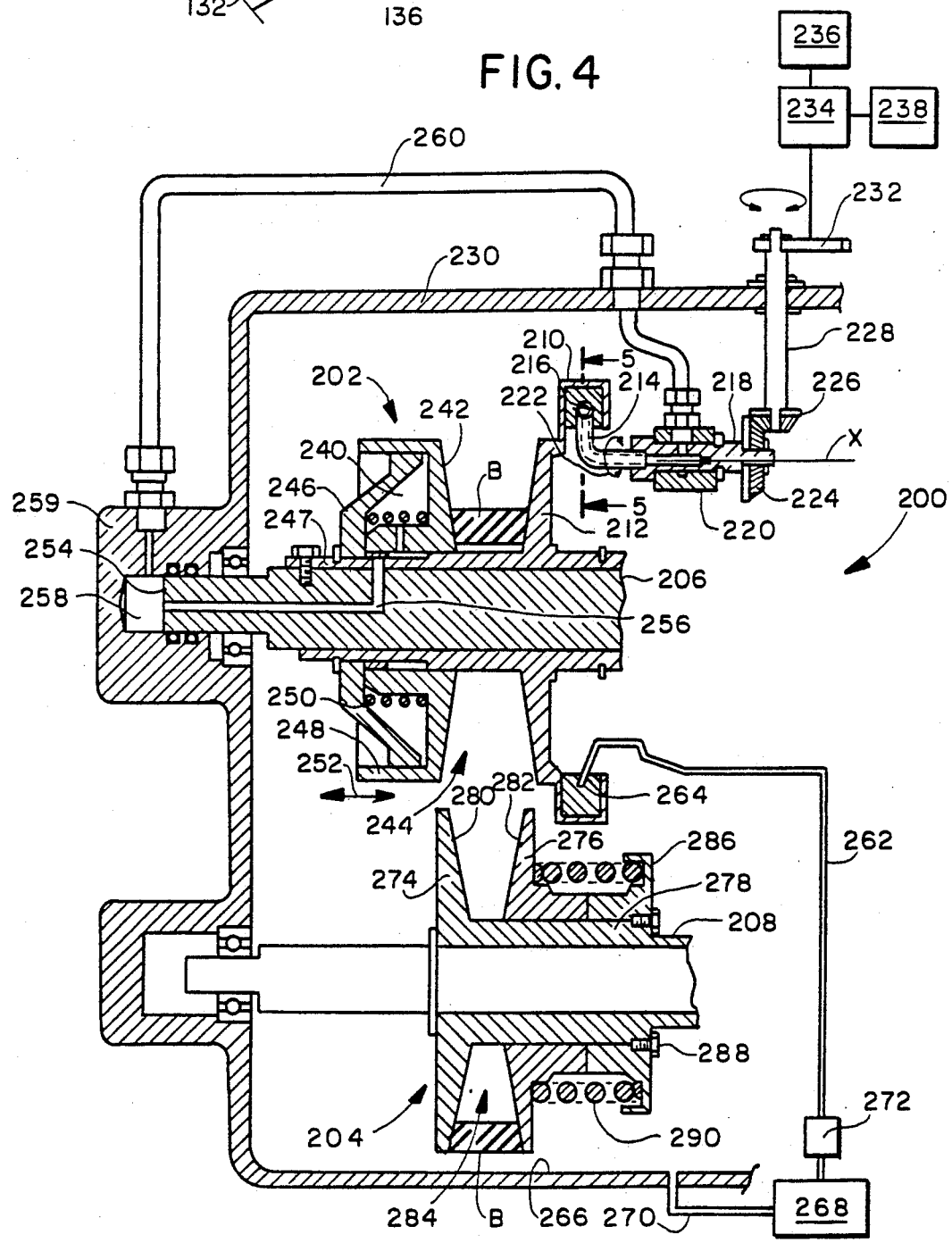
FIG. 4 is a section view of a modified form of belt-type continuously variable transmission according to the present invention.
Figure 5:
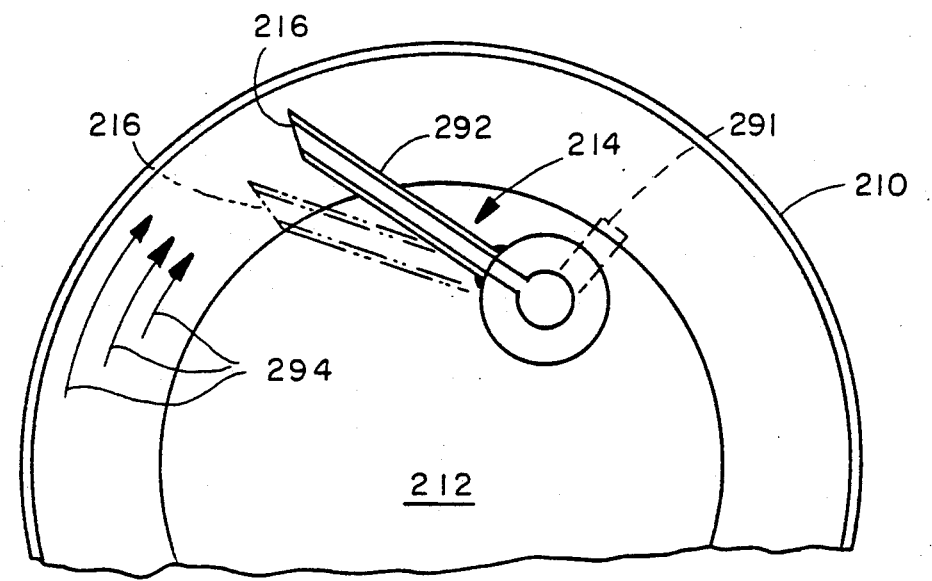
FIG. 5 is an enlarged end elevation view of one of the pulley parts on the FIG. 4 transmission with a fluid reservoir thereon and a pitot tube for sensing the velocity of fluid in the reservoir.
Figure 6:
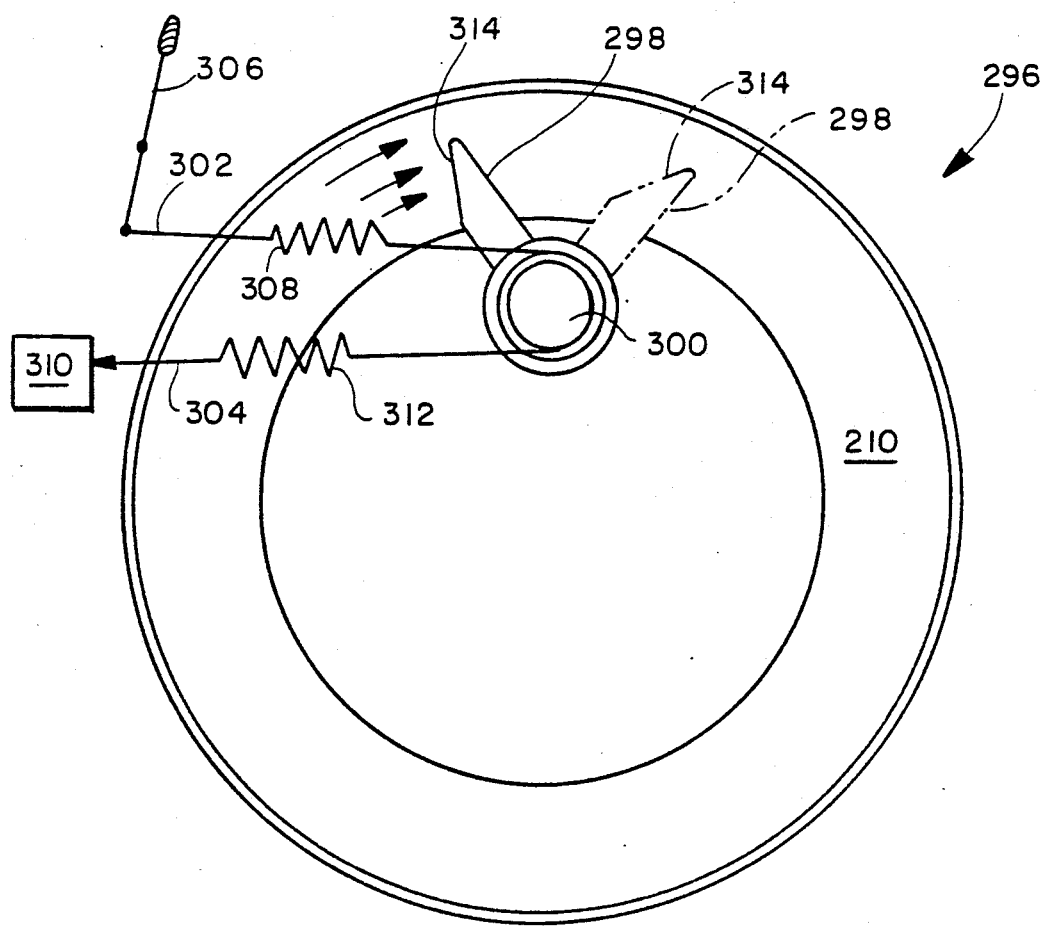
FIG. 6 is a view similar to that in FIG. 5 with a modified form of pitot tube.

FIG. 4 is a section view of a modified form of belt-type continuously variable transmission according to the present invention. Details of part of the transmission, at 200, are shown in FIGS. 5 and 6. Many of the elements in the FIG. 4 correspond to elements in the embodiment in FIGS. 1–3 and thus detailed description of the same is omitted herein. The belt-type continuously variable transmission, at 200 in FIG. 4, has the same basic construction as that of the aforesaid embodiment 10. Variable-speed pulleys 202, 204 are mounted respectively to an input/drive shaft 206 and an output/driven shaft 208. A belt B is trained around the pulleys 202, 204. A ring-shaped fluid reservoir 210 is provided on a fixed pulley half 212. At least one pitot tube 214 is provided with its tip opening 216 inserted in the fluid reservoir 210.

The pitot tube 214 detects the flow speed and pressure of the fluid inside the fluid reservoir 210 which varies with the rotational velocity of the fixed pulley half 212. The pitot tube 214 is connected to a rotary housing 218 which is rotatably mounted in a fixed support block 220. The pitot tube 214 is rotatable with the housing 218 about an axis X that is generally parallel to the axis of the input/drive shaft 206 as indicated by double-headed arrow 222.

The rotary housing 218 is provided at its one end with a bevel gear 224 in mesh with a transverse bevel gear 226 carried on a shaft 228 projecting through and externally of the transmission housing 230. A lever 232 is fixed at the end of the rotary shaft 228 projecting out of the housing 230. The lever 232 is connected to the throttle 234 of an engine 236 by means of a cable (not shown). The lever 232 turns in response to a change of position of the automobile accelerator pedal 238. Movement of the pedal 238 pivots the lever 232 and in turn the shaft 228 and housing 218 through the bevel gears 224, 226 to reposition the tip opening 216 of the pitot tube 214 in the reservoir 210.

A hydraulic cylinder 240 is provided adjacent to a movable pulley half 242 which part 242, in conjunction with pulley have 212, defines a groove 244 for a belt B. The hydraulic cylinder 240 is defined by a plate member 246 fixed to a sleeve 247, which is integral with the pulley half 212, surrounds the input/drive shaft 206 and is fixed thereto. A sleeve-like peripheral wall 248 on the movable pulley half 242 closely surrounds the radially outermost portion of the plate member 246. A coil spring 250 acts between the plate member 246 and movable pulley half 242 and biases the pulley half 242 so as to diminish the width of groove 244 i.e. left-to-right in FIG. 4. The internal pressure of the hydraulic cylinder 240 varies in accordance with the increase or decrease in the amount of fluid, such as oil, serving as the pressure transmitting medium to move the movable pulley half 242 in the line of the double-headed arrow 252 in FIG. 4. The peripheral portion of the plate member 246 may be provided with a packing (not shown) to seal between adjacent surfaces on the peripheral wall 248 and plate member 246 to retain the fluid/oil in the cylinder 240.

The hydraulic cylinder 240 communicates with the end 254 of the input/drive shaft 206 via fluid path 256 bored through the input/drive shaft 206. The path 256 opens into a cavity 258 in the bearing portion 259 of the housing 230. The cavity 258 in the housing 230 communicates in turn with the rotary housing 218 via hydraulic line 260. The hydraulic cylinder 240 communicates consecutively through the fluid path 256, the cavity 258, the hydraulic line 260 and rotary housing 218 to the pitot tube 214 and fluid reservoir 210.

With the above construction, the fluid inside the fluid reservoir 210 flows into or out of the tip opening 216 of the pitot tube 214 to continually adjust the internal pressure of the hydraulic cylinder 240, as dictated by the rotational velocity of the input/drive shaft 206.

A fluid supply conduit 262 recycles fluid through a discharge opening 264 into the reservoir 210. The fluid, such as oil, collects at the bottom 266 of the transmission housing 230, flows by gravity therefrom into a tank 268 via a pipe 270 and is propelled by a pump 272 through the supply conduit 262 and discharged at the end 264 thereof into the reservoir 210. The fluid flowing out of the fluid reservoir 210 falls under the force of gravity against the bottom 266 of the housing 230 where it is accumulated.

The variable-speed pulley 204 mounted to the output/driven shaft 208 consists of a first pulley half 274 suitably fixed to the output/driven shaft 208 and a movable pulley half 276 mounted on a sleeve 278 which is on the first pulley half 274, surrounds the output/driven shaft 208 and is fixed thereto. The pulley halves 274, 276 have axially facing surfaces 280, 282, respectively cooperatively defining a groove 284 for reception of a belt B. The movable pulley half 276 is slidable axially along the sleeve 278 on the fixed pulley half 274. A flange-shaped stopper 286 is fixed to the fixed pulley half 274 by means of bolts 288 adjacent to the movable pulley half 276. A coil spring 290 is mounted between the stopper 286 and the movable pulley half 276 and exerts a bias tending to shift the movable pulley half 276 toward the fixed pulley half 274 i.e. right to left in FIG. 4 so as to diminish the width of groove 244.

The belt-type continuously variable transmission 200 of the present embodiment operates in the same manner as the embodiment in FIGS. 1–3 to obtain an appropriate speed variance ratio for the pulleys 202, 204 by varying the internal pressure of the hydraulic cylinder 240 in response to a change in the rotation velocity of the input/drive shaft 206 and the load on the output/driven shaft 208.

The spring 250 within the hydraulic cylinder 240 assists the operation of the movable pulley half 242 to make the acceleration curve closer to an idealistic proportionally-increasing straight line. The spring 250 is not always necessary when the variation in the speed range is narrow.

When the lever 232 is turned in the above-mentioned embodiment, the pitot tube 214 turns around the axis X to alter the angle of a transverse arm 292 (FIG. 5) and the tip opening 216 thereon with respect to the fixed pulley half 212 and the direction of fluid flow. Therefore, by operating the lever 232, through the accelerator 238, the sensitivity to the oil pressure variation in the hydraulic cylinder 240 can be controlled. When the accelerator 238 is held in a fixed position, as when cruising, the pitot tube 214/arm 292 is situated in the solid line position of FIG. 5. When the accelerator 238 is stepped on, as during rapid acceleration, the pitot tube 214 moves to the phantom position in FIG. 5. The flow direction of the fluid in the fluid reservoir 210 is circumferential, as indicated by arrows 294 in FIG. 5.

The flow velocity of the fluid is higher radially outwardly in the reservoir 210. When the accelerator 238 is depressed, the opening 216 of the pitot tube 214 is also put in the operating fluid at a changed angle with respect to the flow direction of the operation fluid. The speed of the fluid intercepted by the tube opening 216 in the phantom position is slower than that with the tube opening 216 in the solid line position therefor. Accordingly, the internal pressure in the pitot tube 214 is reduced by depressing the accelerator 238 compared to the cruising position therefor. Reduction in the internal pitot tube 214 pressure causes the pressure in the hydraulic cylinder 240 to reduce to thereby move the movable pulley half 242 away from the fixed pulley half 212 to thereby move the belt B radially inwardly of the groove 244 for high torque/low speed drive.

The above structure is desirable in that it simultaneously alters the angle of the pitot tube 214 with respect to the flow direction of the fluid and the radial position of the pitot tube tip opening 216. The invention also contemplates moving the pitot tube 214 radially in a straight line so that the fluid impinges on the pitot tube opening 216 at the same angle regardless of the radial location thereof i.e. the position of the accelerator 238. Alternatively, by making the arm 292 of the pitot tube 214 in FIG. 5 shorter, and changing its location, as shown at 291 in FIG. 5, it is possible to alter only the flow direction of the fluid relative to the tip opening 216 without varying the speed of the fluid thereat.

FIG. 6 shows a modified mechanism 296 for moving the pitot tube 214 in the fluid reservoir 210. The mechanism at 296 in FIG. 6 accounts for movement of the movable pulley half 242 precisely in proportion to a change in the rotational velocity of the pulley 202. In the mechanism 296 in FIG. 6, a pitot tube 298 is mounted in the fluid reservoir 210 and is mounted for pivoting movement between the solid line and phantom positions in FIG. 6. The pitot tube 298 is carried on a rotary shaft 300. Wires 302 and 304 are connected to the shaft 300. By pulling the wires 302 and 304, the shaft 300 can be rotated. The wire 302 is connected to a shift lever 306 via a spring 308, while the wire 304 is connected to an accelerator 310 via spring 312.

With the pulley 202 rotating at a slow speed, the pitot tube 298 is in the solid line position by reason of the balance of forces from the spring 308 and the spring 312. When the rotational speed of the pulley 202 increases, pressure detected by the pitot tube 298 increases. The pitot tube pressure is proportional to the square of the rotational velocity of the pulley 202. The pitot tube 298 is pivoted into the phantom position by reason of the increased fluid flow pressure. Resultingly, the opening 314 of the pitot tube 298 turns by a certain angle in the flow direction of the fluid to reduce the effective diameter of the opening 314. Consequently, the pressure in the pitot tube 298 reduces to fluctuate around a certain value proportional to the rotation speed of the pulley 202 under the influence of the increasing centrifugal force.

FIG. 7 is a section view of another embodiment of a transmission 408 according to the present invention, with details thereof shown in FIGS. 8-12. In this embodiment 408, a hydraulic cylinder 410 is provided in association with an input/drive shaft 412, and the tip opening 414 of a pitot tube 416 is in fluid communication with the hydraulic cylinder 410 and extends into a fluid reservoir 418 provided on the peripheral portion of a fixed pulley half 420. The pitot pressure developed by the operation of the rotating fluid reservoir 418 relative to the pitot tube 416 operates the hydraulic cylinder 410. To maximize the pressure in the cylinder 410 for a given rotational velocity of the input/drive shaft 412, it is necessary to obtain the highest possible pitot pressure. To achieve this end, the transmission 408 is configured so that the tip opening 414 (FIG. 8) of the pitot tube 416 is made in an L-shape so that the length of an offset arm 426 on the main body 427 aligns with the fluid flow direction as the drive/input shaft 412 operates. With the above construction, when a higher pitot pressure is desired, this is achievable by moving the tip opening 414 radially outwardly into the faster fluid flow in the reservoir 418.

To maximize incoming fluid pressure in the pitot tube 416, it is preferable to form the pitot tube 416 as shown in FIGS. 7-10 with a non-uniform cross section and an elliptical cross section at the open end thereof. A preferred bending angle $\Theta_3$ for the pitot tube 416 is in the range of 105° to 112.5°. It is further desirable for the pitot tube to have a streamlined shape in the fluid, as also shown clearly in FIG. 9, so that the pitot tube 416 does not significantly impede the fluid stream through the fluid reservoir 418.

The transmission 408 operates in similar fashion to those transmissions 10, 200 earlier described herein. Consequently, a detailed description of the structure of the transmission is unnecessary. In many respects, the transmission is structurally similar to the transmission 200 in FIG. 4, and corresponding parts are numbered in FIG. 7 as in FIG. 4.

The following describes fluid pressure values using pitot tubes of different shape. Three types of pitot tubes were tested. First, the pitot tube 416, as shown in FIGS. 7 through 10, was tested with the tip opening 414 opening in the flow direction of fluid. Second, pitot tube 428, shown in FIG. 11, was tested with a straight body 429 and a rhomboidal cross section, with the tip opening 430 cut at an angle of 45° to be inserted in the fluid reservoir 418 perpendicular to the flow direction of the fluid. Third, pitot tube 432, as shown in FIG. 12, was tested and has the same construction as the second experimental pitot tube 428 except that it has a round cross section, with a resulting elliptical tip opening 434.

Each of the three experimental pitot tubes 416, 428, 432 was inserted in a fluid reservoir which was 158 mm in radial extent from the shaft center to the periphery of the fluid, 30 mm in axial width, and 29 mm in radial height, with the tip openings 414, 430, 434 of the pitot tubes 416, 428, 432 put in the fluid reservoir 0.5 mm from the periphery of the fluid to measure the maximum pitot pressure. The results of the test are shown in Table 1 below. The fluid was an oil identified as Mulpus #10 and made by NIPPON OIL Co., Ltd. The rotational velocity of the pulley carrying the reservoir was 2600 r.p.m.

TABLE 1

| Shape of Pitot Tube | Maximum pitot pressure (kg/cm) |
| --- | --- |
| Pitot tube 416 | 2.30 |
| Pitot tube 428 | 1.40 |
| Pitot tube 432 | 1.45 |

As is apparent from Table 1, the pitot tube 416, having the configuration shown in FIGS. 7 through 10, obtained a pitot pressure higher than that obtained by each of the other pitot tubes 428, 432.

Figure 11:
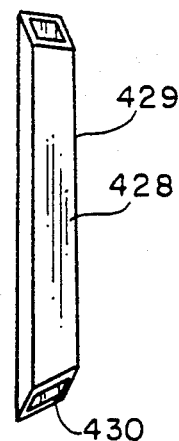
FIG. 11 is an enlarged elevation view of an alternative form of pitot tube.
Figure 12:
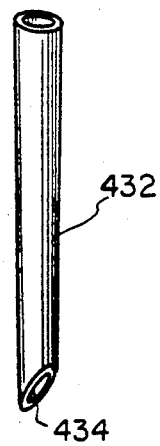
FIG. 12 is a view as in FIG. 11 of a further alternative form of pitot tube.

Each of the pitot tubes 428, 432, as shown in FIGS. 11 and 12, has an opening 430, 434 that is elongate in a radial direction and therefore receives fluid both at a faster stream portion and at a slower stream portion. The pitot tube in accordance with the present invention, as shown in FIGS. 7 through 10, because of the flat nature of the opening 414, as is most apparent from FIG. 10, receives the fluid at only the faster stream portion.

Figure 13:
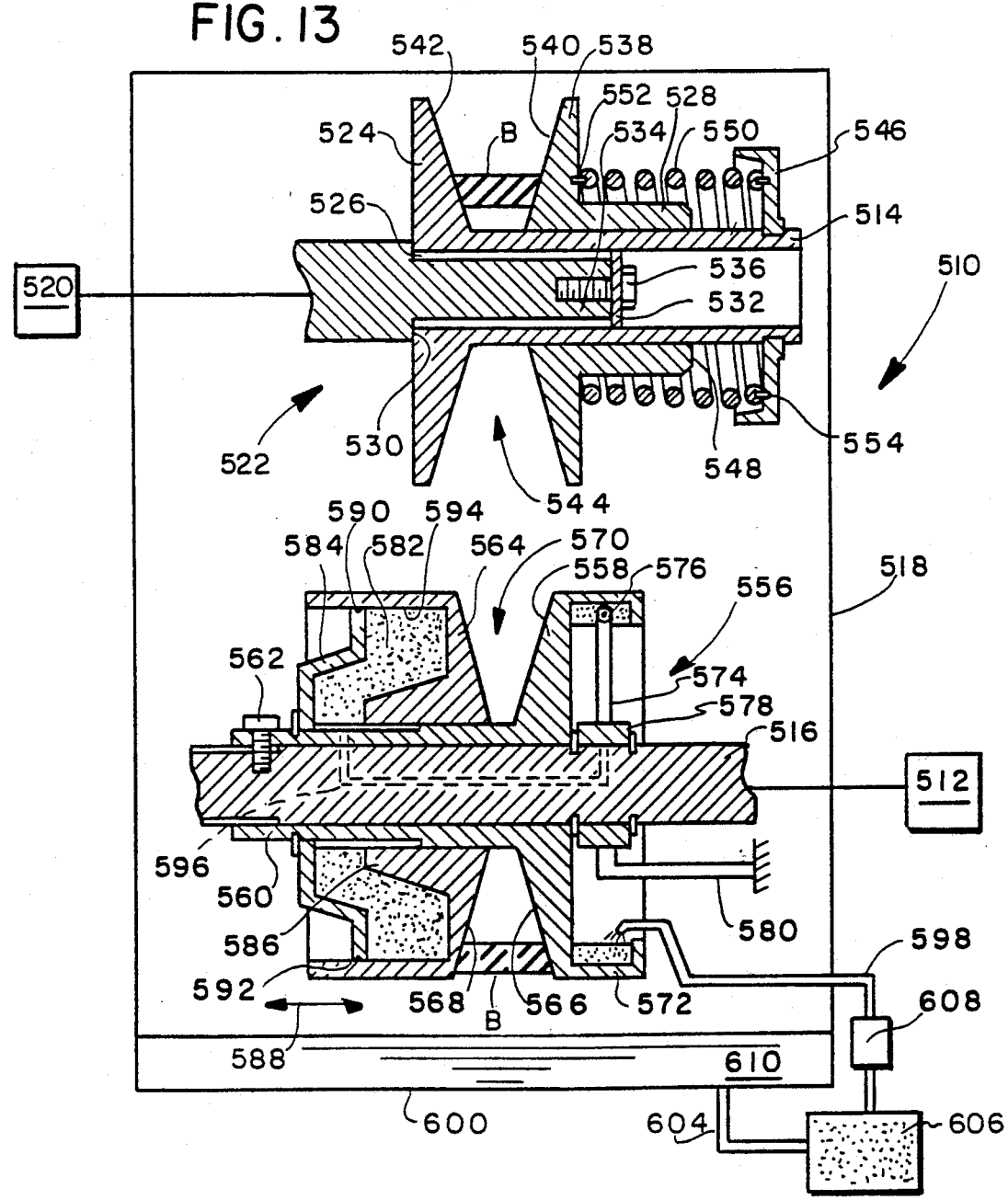
FIG. 13 is a still further modified form of a belt-type continuously variable transmission according to the present invention.
Figure 14:
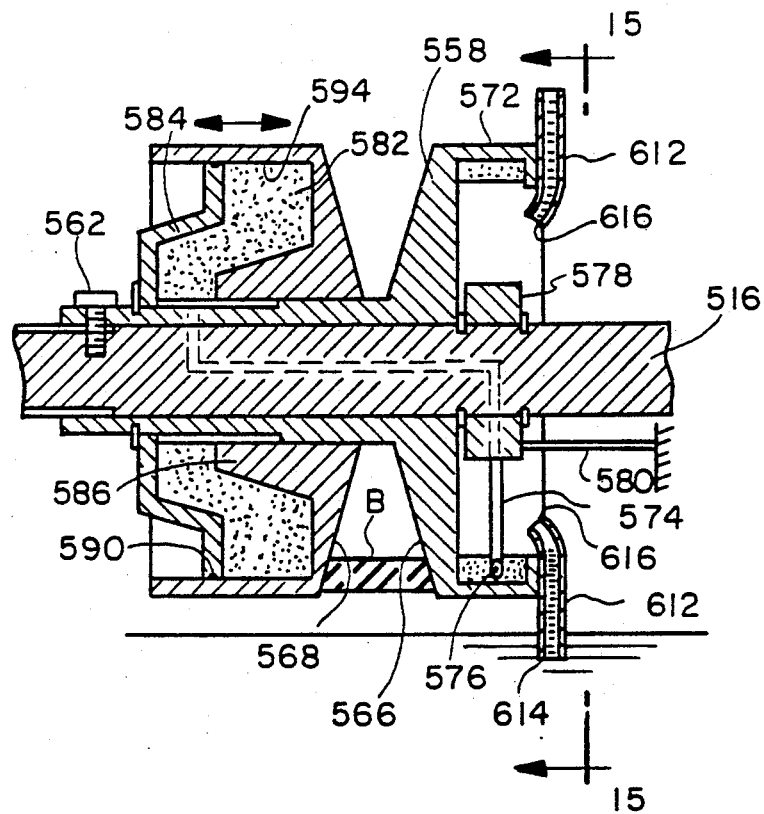
FIG. 14 is a section view of a variable-speed output pulley as on the system in FIG. 13 with a modified form of fluid recycling structure.
Figure 15:
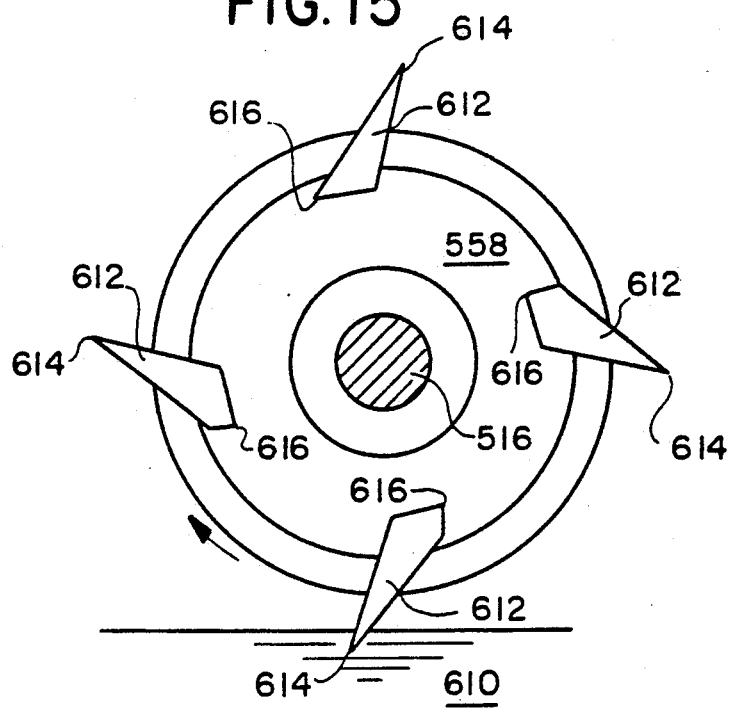
FIG. 15 is an end elevation view of the fluid recycling structure in FIG. 14.

The following describes an environment wherein the belt type continuously variable transmission in accordance with the present invention is used for driving other than an automobile engine. FIG. 13 is a vertical section view of a belt type continuously variable transmission at 510 of a belt type continuously variable transmission at 510 in accordance with the present invention. Details of the transmission 510 are shown in FIGS. 14 and 15.

The belt-type continuously variable transmission 510 is used for driving automobile engine accessories, such as alternators, air compressor pumps, and power steering units, shown schematically at 512 in FIG. 13. An input/drive shaft 514 and output/driven shaft 516 are located inside a housing 518 in parallel relationship. The input/drive shaft 514 is linked indirectly to an engine 520, while the output/driven shaft 516 is linked to each accessory 512 by way of a V-belt or a multi-rib belt.

A variable-speed pulley 522 having a fixed pulley half 524 is mounted on the input/drive shaft 514. There are splines 526 cooperating between the input/drive shaft 514 and a sleeve 528 on the pulley half 524 surrounding the shaft 514. The pulley half 524 is captively held between a shoulder 530 on the shaft 514 and a plate 532 held in place on the shaft end 534 by a bolt 536. A movable pulley half 538 is mounted on the sleeve 528 of the fixed pulley half 524 and has an axially facing surface 540 cooperating with a surface 542 on the pulley half 524 to define a groove 544 for a belt B.

The movable pulley half 538 is slidable axially along the sleeve 528 on the fixed pulley half 524. A flange-shaped stopper 546 is fixed, as by a bolt (not shown) to the sleeve 528 adjacent to the end 548 of the movable pulley half 538. A coil spring 550 is mounted between the stopper 546 and the movable pulley half 538 and urges the movable pulley half 538 biasably toward the fixed pulley half 524 i.e. right-to-left in FIG. 13. The coil spring 550 has its opposite ends engaged with pins 552 and 554 on the movable pulley half 538 and the stopper 546, respectively, to prevent rotation of the spring 550 about its axis.

In a variable-speed pulley 556 mounted to the output/driven shaft 516, a fixed pulley half 558 is provided having an integral sleeve 560 mounted fixedly to the output/driven shaft 516, as by means of a bolt 562, while a movable pulley half 564 is mounted on the sleeve 560 of the fixed pulley half 558. The pulley halves 558, 564 have facing surfaces 566, 568, respectively, cooperatively defining a groove 570 for the belt B.

A dish-shaped fluid reservoir 572 is provided on the outer peripheral portion of the fixed pulley half 558. A pitot tube 574 has a tip opening 576 inserted in the fluid in the reservoir 572.

The pitot tube 574 is mounted to a fixed housing 578. The pitot tube 574 detects the flow speed of the fluid in the fluid reservoir 572, which speed is proportional to the speed of the fixed pulley half 558/shaft 516. The housing 578 is fixed against rotation by a rod 580 secured to the housing 518.

A hydraulic cylinder 582 is defined by the movable pulley half 564. The hydraulic cylinder 582 has a cavity defined between a plate member 584 fixed on the sleeve 560/shaft 516. The hydraulic cylinder 582 is supplied with fluid to vary the pressure therein to thereby shift the movable pulley half 586 axially i.e. in the direction of the double-headed arrow 588 in FIG. 13. A packing 590 may be provided on the peripheral portion 592 of the plate member 584 and the facing surface 594 on the movable pulley half 564 to seal the cylinder 582 against fluid leakage.

The hydraulic cylinder 582 is in fluid communication with the pitot tube 574 by way of a fluid path 596 defined through the output/driven shaft 516, the housing 578 and the sleeve 560. A fluid supply conduit 598 continually supplies fluid to the fluid reservoir 572. The fluid, preferably oil, is collected in a pan 600 at the bottom of the housing 518 for the transmission 510, flows by gravity through a pipe 604 into a tank 606, from where it is delivered by a recycling pump 608 continuously through the supply conduit 598 into the reservoir 572.

As seen in FIGS. 14 and 15, fluid from the supply 610 in the pan 600 may be alternatively delivered to the reservoir 572 by incorporating paddles/scoops 612 on the pulley half 558 that rotate with the shaft 516. In the embodiment shown, four equidistantly spaced paddles/-scoops 612 are provided, though a change in number is primarily a design consideration. The tip portion 614 of each fluid paddle/scoop 612 scoops the fluid in the supply 610 accumulated at the bottom of the housing 518 and delivers the fluid to the fluid reservoir 572 as the shaft 516 rotates. The fluid draws down the paddles/scoops 612 through an outlet end 616 into the reservoir 572 as the shaft 516 rotates. Although the fluid paddles/scoops 612 shown in FIGS. 14 and 15 are in the shape of an axially-divided cylinder, i.e. a gutter shape, the shape of the fluid paddles/scoops 612 is not so limited, as other configurations are contemplated by the invention.

The belt-type continuously variable transmission 510 in accordance with the present invention, having the construction as described above, operates in the following manner. When the rotational velocity of the input drive shaft 514 increases, the rotational velocity of the output/driven shaft 516 increases correspondingly, and the peripheral speed of the fluid in the fluid reservoir 572 also increases. The pitot tube 574 detects the gradually-increasing pressure and increasing amounts of fluid are resultingly delivered into the hydraulic cylinder 582. Resultingly, the belt B settles in a predetermined radial position on the variable-speed pulley 556 on the output/driven shaft 516. The predetermined position of the belt B depends on a) the pitch diameters of the variable-speed pulley 522, 556, b) the spring constant and force of the spring 550 on the variable-speed pulley 522, c) the load, d) the rotating speed, e) the pressure-receiving area of the cylinder 582 in the variable-speed pulley 556, f) the effective radius of the pitot pressure receiving portion, etc.

When the rotational speed of the input/drive shaft 514 increases, the rotational speed of the output/driven shaft 516 also increases. When the rotational speed of the input/drive shaft 514 exceeds a predetermined value, the rotational speed of the output/driven shaft 516 is automatically controlled as dictated by the pressure detected by the pitot tube 574 within a certain range.

The foregoing disclosure of specific embodiments is intended to be illustrative of the broad concepts comprehended by the invention.

We claim:

1. A belt-type continuously variable transmission comprising:
   an input/drive shaft with a rotational axis;
   an output/driven shaft with a rotational axis;
   a first variable speed pulley on the input/drive shaft and having a first pulley part fixed against axial movement relative to the input/drive shaft and a second pulley part movable axially relative to the first pulley part, said first and second pulley parts having facing surfaces cooperatively defining a belt-receiving groove;
   a second variable speed pulley on the output/driven shaft and having a third pulley part fixed against axial movement relative to the output/driven shaft and a fourth pulley part movable axially relative to the third pulley part, said third and fourth pulley parts having facing surfaces cooperatively defining a belt-receiving groove;
   a fluid cylinder;
   means for shifting the second pulley part axially relative to the first pulley part in response to a change in pressure in the fluid cylinder;
   a fluid reservoir on the first variable speed pulley for rotation with the input/drive shaft;
   means for sensing the rotational speed of the fluid in the fluid reservoir as the input/drive shaft is operated; and
   means for communicating fluid in the sensing means to the fluid cylinder to thereby vary the fluid pressure in the fluid cylinder as an incident of a change in the rotational velocity of the input/drive shaft and the fluid in the fluid reservoir.

2. The belt-type continuously variable transmission according to claim 1 including means for continuously supplying fluid to the fluid reservoir.

3. The belt-type continuously variable transmission according to claim 1 in combination with a belt trained about said first and second variable speed pulleys 4. The belt-type continuously variable transmission according to claim 1 wherein said speed sensing means comprises a pitot tube with an inlet opening and means are provided for selectively repositioning the inlet opening with respect to the fluid reservoir.

5. The belt-type continuously variable transmission according to claim 1 wherein said second pulley part is movable axially relative to the first pulley part to diminish the width of the belt-receiving groove on the first variable speed pulley as an incident of the rotational velocity of the input/drive shaft increasing which in turn causes a corresponding increase in the fluid pressure in the fluid cylinder.

6. The belt-type continuously variable transmission according to claim 1 including spring means for normally biasing the second pulley part towards the first pulley part to diminish the width of the belt-receiving groove on the first variable speed pulley.

7. The belt-type continuously variable transmission according to claim 6 wherein there is a stopper element on the input/drive shaft and the biasing means comprises a coil spring interposed between the stopper element and the second pulley part.

8. The belt-type continuously variable transmission according to claim 1 wherein the speed sensing means includes a pitot tube and means for establishing a fluid communication path directly between said fluid reservoir and fluid cylinder at least partially through said input/drive shaft.

9. The belt-type continuously variable transmission according to claim 1 including pressure adjusting means for relieving fluid pressure in said fluid cylinder.

10. The belt-type continuously variable transmission according to claim 9 wherein said pressure adjusting means includes a housing with a movable valve body biased normally in a first direction into a position in which a fluid pathway in communication with the fluid cylinder is blocked by the valve body, said valve body being movable oppositely to said first direction to unblock the fluid pathway in communication with the fluid cylinder.

11. The belt-type continuously variable transmission according to claim 1 including a housing for said transmission, said housing having a pan for collecting fluid from the fluid reservoir and means are provided for recycling fluid from said pan back to said reservoir.

12. The belt-type continuously variable transmission according to claim 11 wherein said recycling means includes at least one paddle/scoop that rotates with the output/drive shaft, said paddle/scoop arranged to move into a supply of fluid in said pan and including means for picking up and depositing fluid from the pan in the fluid reservoir as an incident of rotation of the input/drive shaft.

13. The belt-type continuously variable transmission according to claim 1 wherein said second variable speed pulley includes means normally biasing the fourth movable pulley part towards the third movable pulley part so as to diminish the belt-receiving groove on the second variable speed pulley.

14. The belt-type continuously variable transmission according to claim 13 including cooperating cam means on the fourth pulley part and one of the output/driven shaft and third pulley part for moving the fourth pulley part toward the third pulley part as an incident of the fourth pulley part rotating relative to the one of the output/driven shaft and third pulley part.

15. A variable speed pulley comprising:
   a shaft having a rotational axis;
   a first pulley part;
   a second pulley part;
   means for mounting the first and second pulley parts to the shaft so that the first and second pulley parts cooperatively define a belt-receiving groove and so that at least one of the first and second pulley parts is movable relative to the other of the first and second pulley parts to selectively enlarge and diminish the width of the belt-receiving opening;

a fluid reservoir;

means for mounting the fluid reservoir to at least one of the first and second pulley parts and shaft so that the reservoir follows rotational movement of the shaft;

a fluid cylinder;

means for sensing the rotational speed of fluid in the fluid reservoir and for establishing fluid communication between the fluid reservoir and fluid cylinder to vary the pressure of fluid in the fluid cylinder in response to variation in the rotational speed of fluid in the fluid reservoir.

said sensing and varying means including a pitot tube with an inlet opening and means for repositioning the inlet opening relative to the fluid reservoir; and means for relatively positioning the first and second pulley parts in response to a variation in pressure in the fluid cylinder.

16. The variable speed pulley according to claim 15 in combination with an output/driven shaft having a variable speed pulley.

17. The variable speed pulley according to claim 15 including spring means for normally biasing one of the first and second pulley parts relative to the other of the first and second pulley parts.

18. The variable speed pulley according to claim 15 wherein the pitot tube has an arm with the inlet opening therein and said repositioning means includes means for altering the radial location of the arm inlet opening relative to the fluid reservoir.

19. The variable speed pulley according to claim 15 wherein the pitot tube has an elongate arm with the inlet opening therein and said repositioning means includes means for altering the orientation of the arm and thus the inlet opening with respect to the flow of fluid passing the arm as the shaft is rotated.

20. The variable speed pulley according to claim 15 wherein the pitot tube has an inlet opening and said repositioning means includes means for altering both the radial location of the inlet relative to the fluid reservoir and the orientation of the inlet opening with respect to the flow of fluid passing the arm as the shaft is rotated.

21. The variable speed pulley according to claim 15 wherein the pitot tube has a noncircular cross section along at least a part of its length.

22. The belt-type continuously variable speed pulley according to claim 21 wherein the pitot tube inlet opening has a radial dimension and a circumferential dimension and the inlet opening is larger in the circumferential direction than in the radial direction.

23. The variable speed pulley according to claim 15 wherein the pitot tube is formed in an L-shape.

24. The variable speed pulley according to claim 23 wherein the L-shaped pitot tube has an elongate body and a transverse arm and the arm make an angle with the body that is greater than 90° and less than 180°.

25. The variable speed pulley according to claim 15 in combination with a pressure adjusting means for selectively controlling the fluid pressure in the fluid cylinder.

26. The variable speed pulley according to claim 15 including means for collecting fluid escaping from the fluid reservoir.

27. The variable speed pulley according to claim 26 including means for recycling fluid from the collecting means back to the fluid reservoir.

28. A belt-type continuously variable transmission comprising:

an input/drive shaft with a rotational axis;

an output/driven shaft with a rotational axis;

a first variable speed pulley on the input/drive shaft and having a first pulley part fixed against axial movement relative to the input/drive shaft and a second pulley part movable axially relative to the first pulley part, said first and second pulley parts having facing surfaces cooperatively defining a belt-receiving groove;

a second variable speed pulley on the output/driven shaft and having a third pulley part fixed against axial movement relative to the output/driven shaft and a fourth pulley part movable axially relative to the third pulley part, said third and fourth pulley parts having facing surfaces cooperatively defining a belt-receiving groove;

a fluid cylinder;

means for shifting the second pulley part axially relative to the first pulley part in response to a change in pressure in the fluid cylinder;

a fluid reservoir on the first variable speed pulley for rotation with the input/drive shaft;

means for sensing the rotational speed of the fluid in the fluid reservoir as the input/drive shaft is operated;

means for communicating fluid in the sensing means to the fluid cylinder to thereby vary the fluid pressure in the fluid cylinder as an incident of a change in the rotational velocity of the input/drive shaft and the fluid in the fluid reservoir; and a pressure adjusting means for relieving fluid pressure in said fluid cylinder, said pressure adjusting means including a housing with a movable valve body biased normally in the first direction into a position in which a fluid pathway in communication with the fluid cylinder is blocked by the valve body, said valve body being movable oppositely to said first direction to unblock the fluid pathway in communication with the fluid cylinder, 29. A belt-type continuously variable transmission comprising:

an input/drive shaft with rotational axis;

an output/driven shaft with a rotational axis;

a first variable speed pulley on the input/drive shaft having first and second pulley parts cooperatively defining a first belt-receiving groove, at least one said first and second pulley parts being movable axially relative to the other of the first and second pulley parts to vary the width of the belt-receiving groove;

a second variable speed pulley on the output/driven shaft having third and fourth pulley parts cooperatively defining a second belt receiving groove, at least one said third and fourth pulley parts being movable axially relative to the other of the first and second pulley parts to vary the width of the second belt-receiving groove;

a fluid reservoir on at least one of the first variable speed pulley and input/drive shaft;

means for sensing the rotational speed of the fluid as the input/drive shaft is operated and for causing axial repositioning of at least one of the first and second pulley parts relative to the other of the first and second pulley parts in response to a change of speed of the fluid;

means independent of the speed sensing and repositioning means for varying the width of the second belt-receiving groove; and a fluid cylinder;

means for causing shifting of one of the first and second pulley parts in response to a change of fluid pressure in the fluid cylinder;

said sensing means including a pitot tube with a fluid inlet opening; and means for communicating the pitot tube inlet opening with the fluid cylinder.

30. The belt-type continuously variable transmission according to claim 29 including means for collecting fluid escaping from the fluid reservoir and means for recycling fluid from the collecting means back to the fluid reservoir.

31. The belt-type continuously variable transmission according to claim 29 including means for altering the position of the pitot tube inlet opening relative to the fluid reservoir.

32. A belt-type continuously variable transmission comprising:

an input/drive shaft with a rotational axis;

an output/driven shaft with a rotational axis;

a first variable speed pulley on the input/drive shaft and having a first pulley part fixed against axial movement relative to the input/drive shaft and a second pulley part movable axially relative to the first pulley part, said first and second pulley parts having facing surfaces cooperatively defining a belt-receiving groove;

a second variable speed pulley on the output/driven shaft and having a third pulley part fixed against axis movement relative to the output/driven shaft and a fourth pulley part movable axially relative to the third pulley part, said third and fourth pulley parts having facing surfaces cooperatively defining a belt-receiving groove;

a fluid cylinder;

means for shifting the second pulley part axially relative to the first pulley part in response to a change in pressure in the fluid cylinder;

a fluid reservoir on the first variable speed pulley for rotation with the input/drive shaft;

means for sensing the rotational speed of the fluid in the fluid reservoir as the input/drive shaft is operated;

means for directly communicated fluid in the sensing means to the fluid cylinder to thereby vary the fluid pressure in the fluid cylinder as an incident of a change in the rotational velocity of the input/drive shaft and the fluid in the fluid reservoir; and a cooperating cam means on the fourth pulley part and one of the output/driven shaft and third pulley part for moving the fourth pulley part towards the third pulley part as an incident of the fourth pulley part rotating relative to the one of the output/driven shaft and third pulley part.

33. A belt-type continuously variable transmission comprising:

an input/drive shaft with a rotational axis;

an output/driven shaft with a rotational axis;

a first variable speed pulley on the input/drive shaft and having a first pulley part fixed against axial movement relative to the input/drive shaft and a second pulley part movable axially relative to the first pulley part, said first and second pulley parts having facing surfaces cooperatively defining a belt-receiving groove;

a second variable speed pulley on the output/driven shaft and having a third pulley part fixed against axial movement relative to the output/driven shaft and a fourth pulley part movable axially relative to the third pulley part, said third and fourth pulley parts having facing surfaces cooperatively defining a belt-receiving groove;

a fluid cylinder;

means for shifting the second pulley part axially relative to the first pulley part in response to a change in pressure int he fluid cylinder;

a fluid reservoir on the first variable speed pulley for rotation with the input/drive shaft;

means for sensing the rotational speed of the fluid in the fluid reservoir as the input/drive shaft is operated;

means for communicating fluid i the sensing means to the fluid cylinder to thereby vary the fluid pressure in the fluid cylinder as an incident of change in the rotational velocity of the input/drive shaft and the fluid in the fluid reservoir; and a spring means for normally biasing the second pulley part towards the first pulley part to diminish the width of the belt-receiving groove on the first variable speed pulley.

34. The belt-type continuously variable transmission according to claim 33 wherein there is a stopper element on the input/drive shaft and the biasing means comprises a coil spring interposed between the stopper element and the second pulley part.

* * * * *